United States Patent [19]
Uesugi

[11] Patent Number: 6,002,727
[45] Date of Patent: Dec. 14, 1999

[54] INTERFERENCE SIGNAL CANCELLATION SYSTEM

[75] Inventor: Mitsuru Uesugi, Yokohama, Japan

[73] Assignee: Matsushita Electric Industrial Co., Ltd., Osaka, Japan

[21] Appl. No.: 08/951,539

[22] Filed: Oct. 16, 1997

[30] Foreign Application Priority Data

Oct. 18, 1996 [JP] Japan ................................ 8-295922

[51] Int. Cl.$^6$ ................................................ H03D 1/04
[52] U.S. Cl. .................. 375/346; 375/200; 455/296; 370/342; 370/479
[58] Field of Search ............................. 375/200, 207, 375/346, 343, 349; 455/296, 303; 370/320, 342, 441, 479

[56] References Cited

U.S. PATENT DOCUMENTS

| | | | |
|---|---|---|---|
| 4,470,138 | 9/1984 | Gutleber | 375/343 |
| 5,467,368 | 11/1995 | Takeuchi et al. | 375/206 |
| 5,553,062 | 9/1996 | Schilling et al. | 370/479 |

FOREIGN PATENT DOCUMENTS 7-131382 5/1995 Japan .
7-273713 10/1995 Japan .

*Primary Examiner*—Stephen Chin
*Assistant Examiner*—Chieh M. Fan
*Attorney, Agent, or Firm*—Pearne, Gordon, McCoy & Granger LLP

[57] ABSTRACT

The interference signal cancellation system of the invention has: usual CDMA demodulators respectively disposed for codes, each of the CDMA demodulators having a matched filter 105 and an identifier 107; and a likelihood calculator 108 for each of the demodulators. The apparatus further has: a buffer 103 which stores provisional decision values; another buffer 109 which stores likelihoods; an order determining device 110 which determines an order in accordance with the likelihoods; a respreading device 111 which performs respreading in accordance with the determined order; a delay device 102 which delays a received signal; and a subtractor 112 which subtracts a result of the respreading from the delayed data. For each symbol, the largest likelihood is selected, and a replica is generated by using it. A desired performance is attained by performing one provisional decision and one demodulation. Therefore, computational complexity is reduced and realization is facilitated.

6 Claims, 7 Drawing Sheets

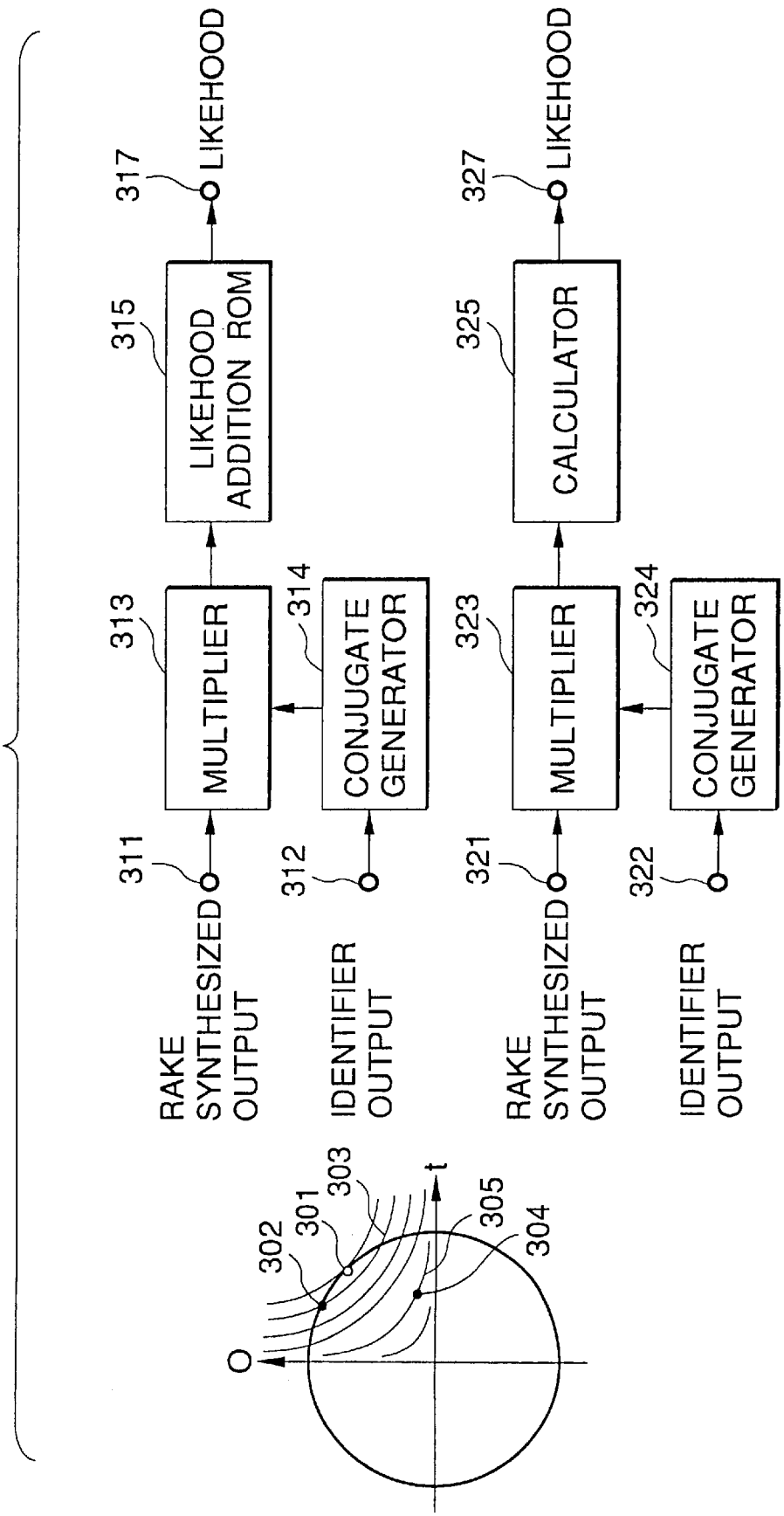

INTERFERENCE SIGNAL CANCELLATION SYSTEM

BACKGROUND OF THE INVENTION

1. Field of the Invention

The invention relates to an interference signal cancellation system which is used in a CDMA mobile communication system, and particularly to an interference signal cancellation system which can increase a communication capacity by suppressing interference.

2. Description of the Related Art

Conventionally, examples of an interference signal cancellation system are proposed in, for example, Japanese Patent Unexamined Publication (Kokai) Nos. Hei 7-131382 and Hei 7-273713.

In the examples, the accuracy is gradually increased by repeating an interference canceling operation several times. The error rate is improved by canceling mutual interference among plural users, so that the capacity is increased.

FIG. 7 is a block diagram showing the configuration of an interference cancellation system of the prior art. In FIG. 7, a received signal 1 is supplied to a delay device 2 and matched filters 9. An output of each matched filter 9 is multiplied in a coefficient multiplier 10 with the eigenvalue $\lambda$ of a cross-correlation matrix of input signals, and the multiplied output is sent to a first-stage correlation cancellation circuit 7. In the circuit, the output is supplied to a respreading device 11 and a delay device 13. The output of the respreading device 11 is subtracted in a subtractor 12 from an output of the delay device 2.

When plural codes are used, the subtraction is conducted for all the codes. The result of the subtraction is supplied via an inverse diffusion device 14 to a coefficient multiplier 15 to be multiplied with the eigenvalue $\lambda$ of the cross-correlation matrix of the input signals. The multiplication result and an output of the delay device 13 are added to each other in an adder 16 to be output as a first-stage demodulation result 17.

The output of the delay device 2 is output via a delay device 3 as a first-stage delayed received signal 4. An Mth-stage correlation cancellation circuit 8 is dependently connected to the rear of the first-stage correlation cancellation circuit 7. An Mth-stage input signal 5 is supplied together with an Mth-stage demodulation input 18 to the Mth-stage correlation cancellation circuit 8 which in turn outputs an Mth-stage delayed signal 6 and an Mth-stage demodulation result 19.

The operation of the prior art example will be described with reference to FIG. 7. The received signal 1 is a CDMA multiple signal. The corresponding matched filter 9 correlates diffusion codes of the users, and fetches the signal of the corresponding user while suppressing signals of the other users and thermal noises. The signal is multiplied in the coefficient multiplier 10 with the eigenvalue $\lambda$ of a cross-correlation matrix of input signals among the users. The multiplication result is rediffused in the respreading device 11, and supplied also to the delay device 13.

The signal of each user which has been rediffused is subtracted in the subtractor 12 from the signal which is obtained by delaying the received signal 1 in the delay device 2. The output of the subtractor is then subjected to inverse diffusion in the inverse diffusion device 14. The result of the inverse diffusion is multiplied in the coefficient multiplier 15 with the eigenvalue $\lambda$ of the cross-correlation matrix of the input signals. The multiplication result and the output of the delay device 13 are added to each other in the adder 16 to be output as the first-stage demodulation result 17. This result exists for each of the users.

The output of the delay device 2 is further delayed in the delay device 3 so as to be output as the first-stage delayed received signal 4. The block which receives the outputs of the delay device 2 and the multiplier 10, and which outputs the first-stage delayed received signal 4 and the first-stage demodulation result 17 constitutes the first-stage correlation cancellation circuit 7.

The Mth-stage correlation cancellation circuit 8 is configured in the same manner as the first-stage correlation cancellation circuit 7, and dependently connected to the rear of the first-stage correlation cancellation circuit 7. As the number of stages which are dependently connected is larger, performance is higher. Therefore, two or more circuits are usually connected in order to attain higher performance.

In this way, even an interference signal cancellation system of the prior art can suppress interference and allow the capacity to be increased.

In the prior art example described above, however, the interference canceling operation must be repeated in order to attain desired performance. Namely, processes such as inverse diffusion and diffusion which require large computational complexity are repeated, and hence computational complexity becomes enormous, thereby producing a problem that it is difficult to realize desired performance.

SUMMARY OF THE INVENTION

The invention has been conducted in order to solve the problem of the prior art, and therefore an object of the invention is to provide an interference signal cancellation system which can cancel interference without repeating an interference canceling operation, in order to obtain desired performance.

According to the invention, during a unit time, all symbols of all users are provisionally decided, likelihoods are added to the provisionally decided symbols, respectively, the symbols are decoded in decreasing order of probability, and a replica is subtracted from remaining signals, thereby enabling desired performance to be obtained without repeating stages. The apparatus of the invention can satisfactorily operate also in cases such as that where a long code is used, where there exists a delayed wave, and where users have different timings (this case causes a problem particularly in an uplink line).

To achieve the above-object, according to a first aspect of the invention, there is provided an interference signal cancellation system comprising: usual CDMA demodulators respectively disposed for codes, each of the CDMA demodulators having a matched filter and an identifier; and a likelihood calculator for each of the CDMA demodulators, the apparatus further comprising: a buffer which stores provisional decision values; another buffer which stores likelihoods; an order determining device which determines an order in accordance with the likelihoods; a respreading device which performs respreading in accordance with the determined order; a delay device which delays a received signal; and a subtractor which subtracts a result of the respreading from the delayed data, the apparatus canceling interference while demodulating codes in decreasing order of likelihood. Since interference is canceled while demodulating codes in decreasing order of likelihood, the invention attains the function that the performance can be improved and repeated operations are not required.

According to a second aspect of the invention, there is provided the interference signal cancellation system according to the first aspect of the invention is so configured that the likelihood calculator comprises a set of a conjugate generator, a multiplier, an arc tangent calculator, and an absolute value calculator, or a set of an arc tangent calculator, a subtractor, and an absolute value calculator, and the likelihood calculator outputs an absolute value of a phase difference between an input and an output of the identifier. Since the absolute value of a phase difference between an input and an output of the identifier is output, the invention attains the function that an order of symbols which is larger in likelihood can be generated.

In a third aspect of the invention, the interference signal cancellation system according to the first aspect of the invention is so configured that the likelihood calculator comprises a set of a conjugate generator, a multiplier, and a likelihood addition ROM, or a set of a conjugate generator, a multiplier, an I*Q calculator, and an absolute value calculator, and a likelihood is set to be larger as an input of the identifier is more remote from an I-axis and a Q-axis. Since a likelihood is set to be larger as the input of the identifier is more remote from the I-axis and the Q-axis, the invention attains the function that an order of symbols which is larger in likelihood can be generated even when the amplitude of a received signal is varied.

In a fourth aspect of the invention, the interference signal cancellation system according to one of the first to third aspects of the invention is so configured that, in respreading of the respreading device, when users have different timings or when there exists a delayed wave, respreading is performed by convoluting an impulse response which is obtained by convoluting an impulse response of a transmission/receiving filter; into an estimated line in consideration of influence due to band limitation, thereby improving performance. Since respreading is performed by convoluting an impulse response which is obtained by convoluting an impulse response of a transmission/receiving filter, into an estimated line in consideration of influence due to band limitation, the invention attains the function that performance can be improved.

In a fifth aspect of the invention, the interference signal cancellation system according to one of the first to fourth aspects of the invention is so configured that, in the order determination of the order determining device, when a frame contains a known signal such as a pilot signal, the order is determined with assigning highest priority to the known signal, thereby improving performance. Since, when a frame contains a known signal such as a pilot signal, the order is determined with assigning highest priority to the known signal, the invention attains the function that performance can be improved.

In a sixth aspect of the invention, the interference signal cancellation system according to one of the first to fifth aspects of the invention is so configured that, in the likelihood calculator, the calculator comprises a conjugate generator, a multiplier, and an absolute value calculator, and independent likelihoods are respectively added to I and Q sides on the basis of real and imaginary parts obtained as a result of multiplication; also in the order determining device, the I and Q sides are independently handled; and, also in the respreading device and the subtractor, the I and Q sides are processed in independent orders in accordance with the order determined in the order determining device. According to the invention, independent likelihoods are respectively added to I and Q sides on the basis of real and imaginary parts obtained as a result of multiplication; also in the order determining device, the I and Q sides are independently handled; and, also in the respreading device and the subtractor, the I and Q sides are processed in independent orders in accordance with the order determined in the order determining device. Therefore, the invention attains the function that performance can be improved.

The above and other objects and features of the present invention will be more apparent from the following description taken in conjunction with the accompanying drawing.

BRIEF DESCRIPTION OF THE DRAWINGS

FIG. 3 is a block diagram showing the configuration of a likelihood calculator according to a third embodiment of the invention;

DETAILED DESCRIPTION OF THE PREFERRED EMBODIMENTS

Hereinafter, embodiments of the invention will be described with reference to FIGS. 1 to 6.

(First Embodiment)

Figure 1:
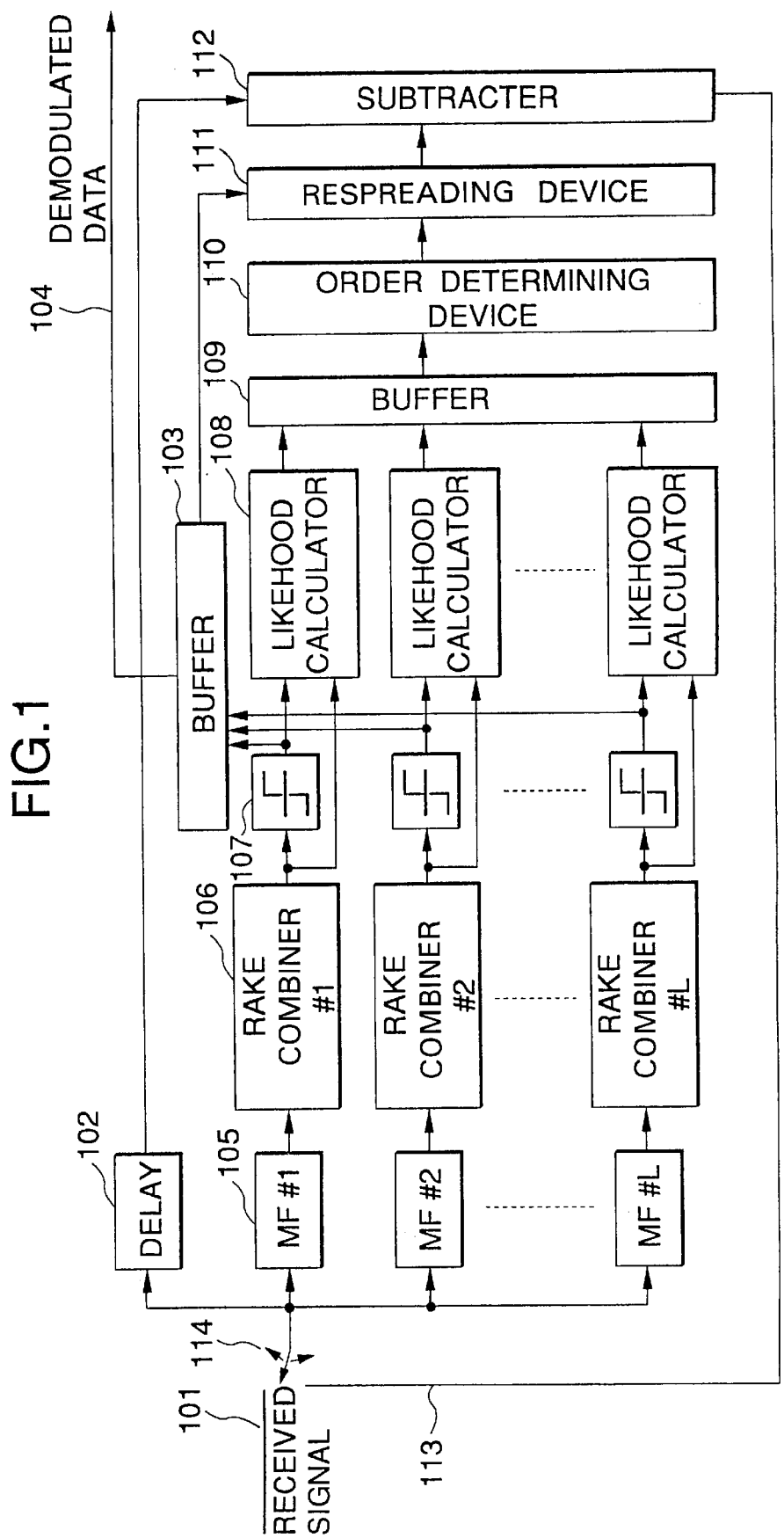
FIG. 1 is a block diagram showing the configuration of an interference signal cancellation system according to a first embodiment of the invention.

FIG. 1 is a block diagram schematically showing the configuration of the interference signal cancellation system of the invention. Referring to FIG. 1, a selection switch 114 selects a received signal 101 or an interference-canceled signal 113. The selected signal enters a delay device 102 and matched filters 105. An output of each matched filter 105 is supplied to an identifier 107 and a likelihood calculator 108, via a RAKE combiner 106. An output of the identifier 107 is supplied to the likelihood calculator 108 and a decision value buffer 103. An output of the likelihood calculator 108 is supplied to a likelihood buffer 109. An output of the likelihood buffer is supplied to an order determining device 110. An output of the order determining device is supplied together with that of the decision value buffer 103 to a respreading device 111. An output of the respreading device and that of the delay device 102 are supplied to a subtractor 112. The decision value buffer 103 outputs a demodulated data 104.

Next, the operation of the interference signal cancellation system of the invention will be described.

Referring to FIG. 1, the selection switch 114 first selects the received signal 101. The corresponding matched filter 105 correlates diffusion codes for each user, and fetches the signal of the corresponding user while suppressing signals of the other users and thermal noises. The RAKE combiner 106 performs the RAKE synthesization on the signal so as to improve the quality of the signal. The result of the synthesization is subjected to provisional decision in the identifier 107.

In a usual CDMA receiver, this result is output as a reception result. In the case where diffusion codes of plural users are not orthogonal to each other, however, the matched filters 105 cannot completely separate the codes. In the case where there exists a delayed wave, a temporal correlation exerts an influence. Furthermore, in the case where users have different timings, even when diffusion codes are orthogonal to each other, interference occurs unless a temporal correlation of zero is attained. Because of these reasons, the outputs of the identifiers 107 are lower in quality as users are larger in number.

In the first embodiment of the invention, all signals of all users in a certain zone (for example, a zone of one slot) are first received in the same method as a usual CDMA, and the outputs of the identifiers 107 are stored in the decision value buffer 103. Both the input and output of each of the identifiers 107 are supplied to the corresponding likelihood calculator 108, and the likelihood is calculated. The likelihood is an index indicating the probability of the symbol. For example, the Euclidean distance between the input and the output of the identifier 107 is used as the likelihood.

The outputs of the likelihood calculators 108 for all signals of the users in a certain zone are supplied to the likelihood buffer 109. The outputs are compared in magnitude with each other in the order determining device 110 and the order is determined in decreasing sequence of likelihood.

With respect to the output of the highest rank, the provisional decision value is output as it is as the demodulated data 104. At the same time, the output of the highest rank is rediffused in the respreading device 111 on the basis of the value which is provisionally decided in the identifier 107. In the subtractor 112, the output of the respreading device is subtracted from the received signal which has been delayed in the delay device 102, thereby obtaining the interference-canceled signal 113. If the provisional decision value is correct, interference on which the corresponding symbol exerts an influence is completely canceled. Thereafter, the selection switch 114 selects the interference-canceled signal 113.

Only symbols which are affected by the above-mentioned respreading of the provisional decision value are again subjected to the same calculation as that described above. The results of the identifiers 107 are stored in the decision value buffer 103, and the outputs of the likelihood calculators 108 in the likelihood buffer 109.

Thereafter, the outputs are compared in magnitude with each other in the order determining device 110 and the order is determined in decreasing sequence of likelihood. In this process, the symbol which has been initially selected is omitted. With respect to the output of the highest rank, the provisional decision value is output as it is as the demodulated data 104. At the same time, the output of the highest rank is rediffused by using an impulse response of the line on the basis of the value which is provisionally decided in the identifier 107. In the subtractor 112, the output of the respreading device is subtracted from the received signal which has been delayed in the delay device 102, thereby obtaining the interference-canceled signal 113. At this stage, interferences of the two symbols have been canceled. Hereinafter, this operation is performed on all the symbols.

The impulse response of the line is required in the RAKE reception. Therefore, the method performed also in an existing CDMA receiver is employed as it is. A symbol of the largest likelihood is excellent in quality and therefore has a higher probability of correctness. Consequently, the subtraction of a signal which has been rediffused allows cancellation of interference to be accurately performed.

In the case where a long code is used, symbols have different magnitudes of interference. Among a large number of symbols, therefore, symbols which are coincidentally substantially free from interference exist with a high possibility. The quality of such a symbol which has been subjected to the provisional decision is very excellent. According to the apparatus, therefore, desired performance can be obtained without increasing the number of stages to be performed in order to improve the quality.

(Second Embodiment)

Figure 2:
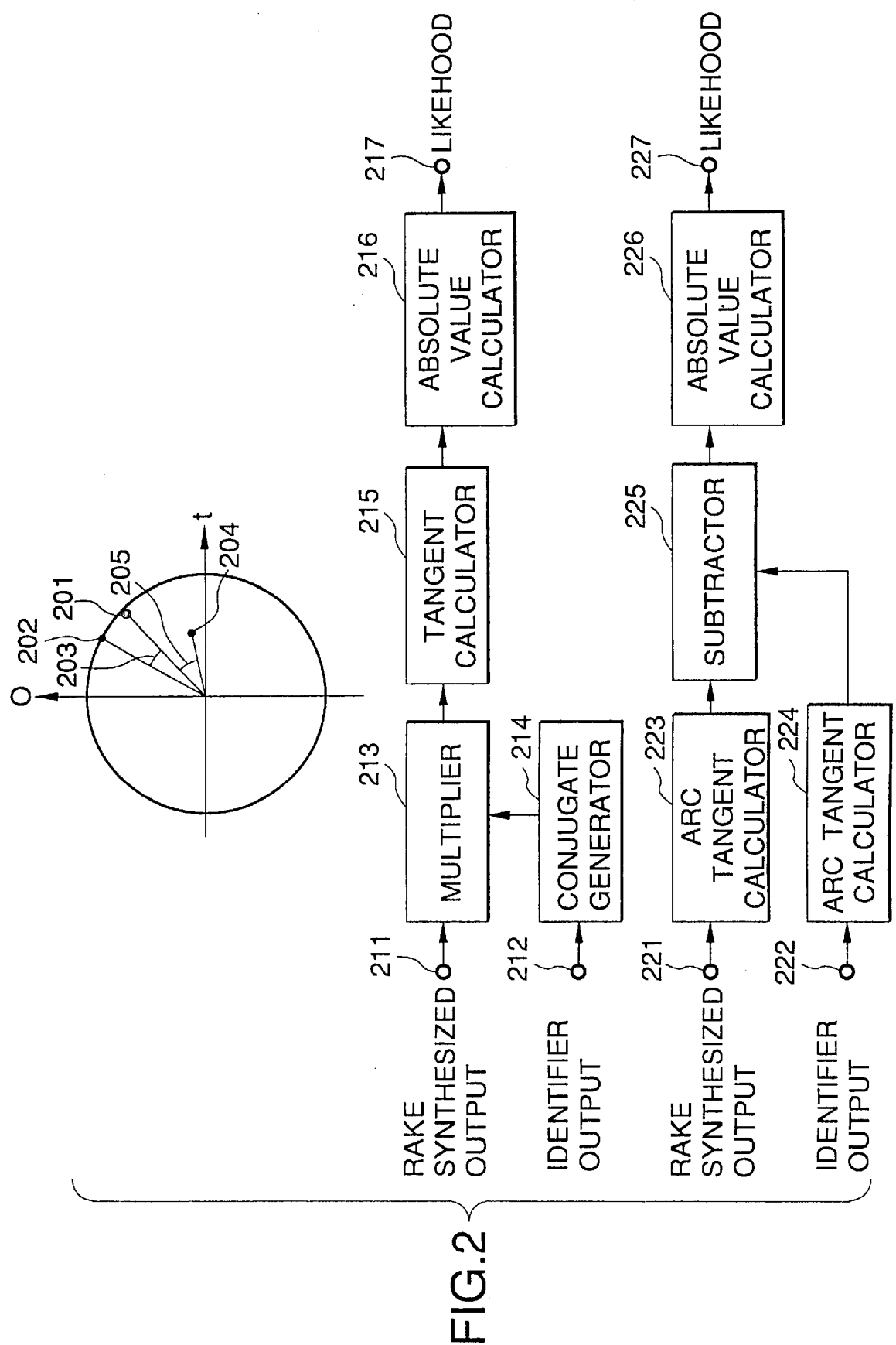
FIG. 2 is a block diagram showing the configuration of a likelihood calculator according to a second embodiment of the invention.

FIG. 2 is a block diagram showing the configuration of a likelihood calculator in a second embodiment of the invention. Referring to the right part of FIG. 2, in a first configuration, the likelihood calculator comprises a multiplier 213, a conjugate generator 214, an arc tangent calculator 215, and an absolute value calculator 216. In a second configuration, the likelihood calculator comprises arc tangent calculators 223 and 224, a subtractor 225, and an absolute value calculator 226.

Next, the operation of the second embodiment of the invention will be described.

Referring to the left part of FIG. 2, an identifier output 201 is obtained by reproduction of a transmission symbol which has the highest possibility from RAKE synthesized outputs 202 and 204. In QPSK, for example, it is possible to judge the phase at which transmission is conducted, from four kinds of phases (45 deg., 135 deg., 225 deg., and 315 deg.) in accordance with the quadrants of the RAKE synthesized outputs 202 and 204. The RAKE synthesized output 202 is in the first quadrant, and hence the identifier output 201 is 45 deg. As a result, a phase error 203 between the RAKE synthesized output and the identifier output 201 is obtained. As the phase error is smaller, the likelihood is larger.

The RAKE synthesized output 204 also is in the first quadrant although having a different amplitude. Consequently, the identifier output 201 is 45 deg. As a result, a phase error 205 between the RAKE synthesized output and the identifier output 201 is obtained. In usual CDMA, particularly, an uplink signal is subjected to a power control so that the signal levels of users are equal to each other. In this case, therefore, it is possible to attain sufficient performance even when the likelihood is judged on the basis of only the phase error. It is assumed that the likelihood is larger as the phase error is smaller.

The likelihood calculator which obtains the value will be described. In the first configuration of the likelihood calculator, a RAKE synthesized output 211 is multiplied in the multiplier 213 with a conjugate value which is produced from an identifier output 212 in the conjugate generator 214. The arc tangent calculator 215 obtains the phase of the multiplication result, and the absolute value calculator 216 obtains the absolute value. The absolute value is then output as a likelihood 217.

In the second configuration of the likelihood calculator, both the phases of a RAKE synthesized output 221 and an identifier output 222 are calculated in the arc tangent calculators 223 and 224, respectively. The difference between the phases is obtained in the subtractor 225, and the absolute value of the difference is obtained in the absolute value calculator 226. The absolute value is then output as a likelihood 227. According to this configuration, it is possible to realize the likelihood calculator of the interference signal cancellation system which has been described as the first embodiment.

(Third Embodiment)

FIG. 3 is a block diagram showing the configuration of a likelihood calculator in a third embodiment of the invention. Referring to the right part of FIG. 3, in a first configuration, the likelihood calculator comprises a multiplier 313, a conjugate generator 314, and a likelihood addition ROM 315. In a second configuration, the likelihood calculator comprises a multiplier 323, a conjugate generator 324, and an I*Q calculator 325.

Next, the operation of the third embodiment of the invention will be described.

Referring to the left part of FIG. 3, an identifier output 301 is obtained by reproduction of a transmission symbol which has the highest possibility from RAKE synthesized outputs 302 and 304. In QPSK, for example, it is possible to judge the phase at which transmission is conducted, from four kinds of phases (45 deg., 135 deg., 225 deg., and 315 deg.) in accordance with the quadrants of the RAKE synthesized outputs 302 and 304. The RAKE synthesized output 302 is in the first quadrant, and hence the identifier output 301 is 45 deg. In the case where the accuracy of the power control is poor, for example, amplitudes are different depending on users. Therefore, it is preferable to obtain a likelihood with using also amplitude information. The likelihood which is directly related with the error rate is the degree of separation from the I-axis and the Q-axis. Therefore, the quadrant is determined in the identifier output 301, and the likelihood corresponding to an error contour 303 is output. A likelihood is larger when the identifier is more remote from the I- and Q-axes.

The RAKE synthesized output 304 also is in the first quadrant although having a different amplitude. Consequently, the identifier output 301 is 45 deg. In this case, the amplitude is small, and hence the likelihood obtained in an error contour 305 is smaller than that for the RAKE synthesized output 302. For example, an error contour may be determined according to a standard in which, when $|I|*|Q|=Z$, outputs having the same value of Z are set to have the same likelihood and a likelihood is larger as Z is larger. In this case, it is assumed that, as the value is larger, the likelihood is larger.

The likelihood calculator which obtains the value will be described. In the first configuration of the likelihood calculator, a RAKE synthesized output 311 is multiplied in the multiplier 313 with a conjugate value which is produced from an identifier output 312 in the conjugate generator 314. Therefore, the RAKE synthesized output 311 is moved into the first quadrant, and, on the basis of the value of the output, the likelihood addition ROM 315 outputs the height of the error contour, thereby obtaining a likelihood 317.

In the second configuration of the likelihood calculator, a RAKE synthesized output 321 is multiplied in the multiplier 323 with a conjugate value which is produced from an identifier output 322 in the conjugate generator 324. Therefore, the RAKE synthesized output 321 is moved into the first quadrant. From this result, the I*Q calculator 325 calculates a value of I*Q. The calculated value is output as it is as a likelihood 327. As a result, it is possible to realize a standard in which, when I*Q=Z, outputs having the same value of Z are set to have the same likelihood and a likelihood is larger as Z is larger. According to this configuration, in the case where, for example, there are errors in a power control, it is possible to attain performance which is higher than that of the second embodiment.

(Fourth Embodiment)

Figure 4A:
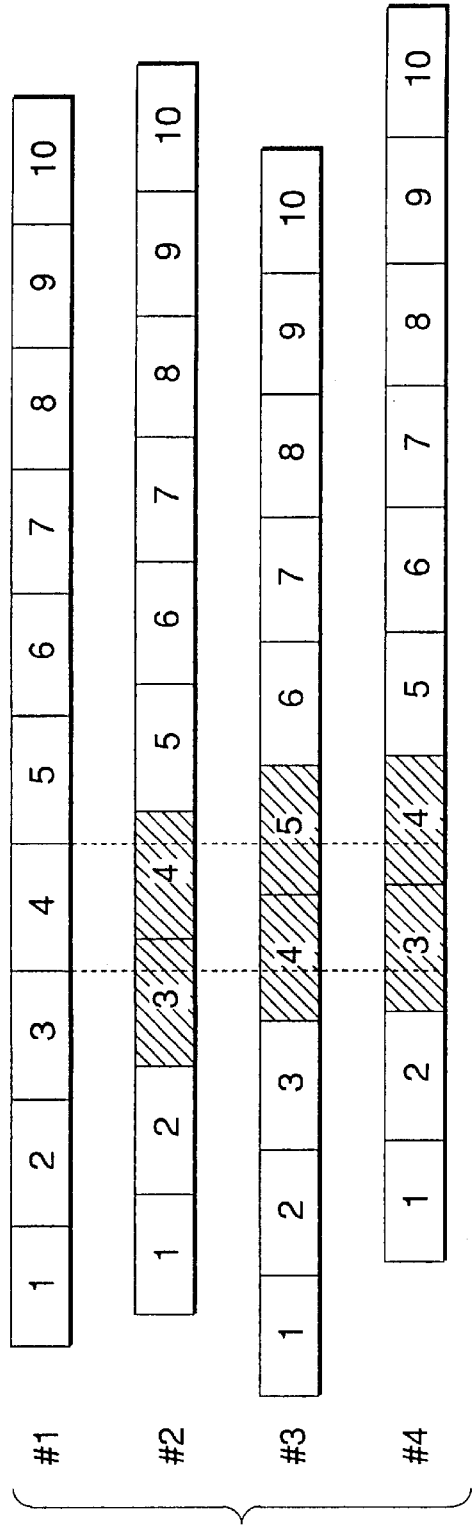
FIGS. 4A and 4B are diagram illustrating the operation of a likelihood calculator according to a fourth embodiment of the invention.
Figure 4B:
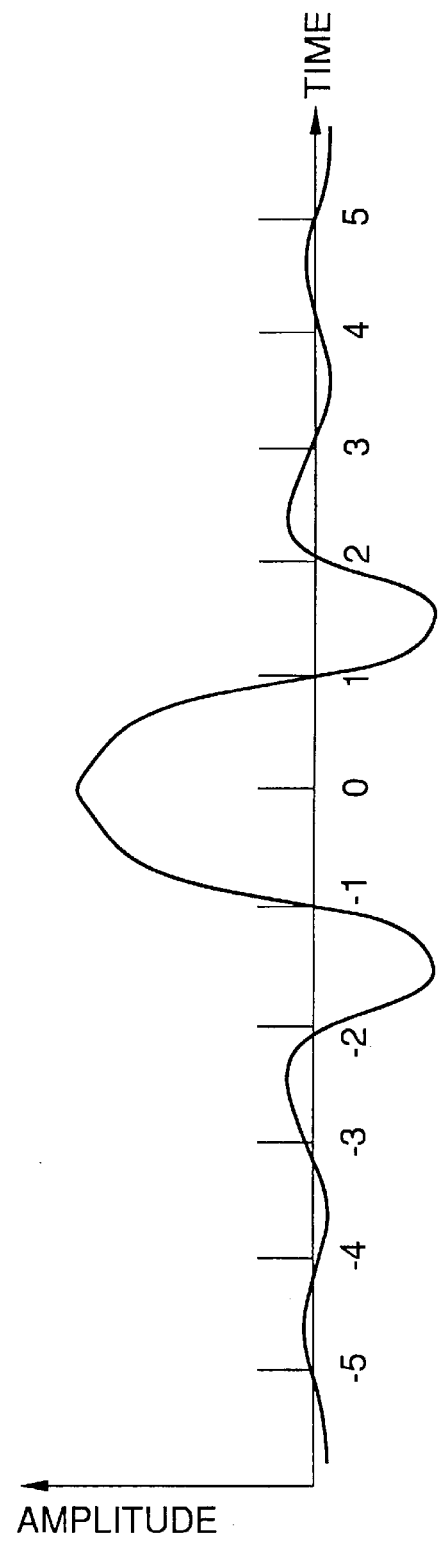

FIGS. 4A and 4B are diagrams illustrating a fourth embodiment of the invention. FIG. 4A shows reception timings of four users, the shaded portions indicate a symbol of interest and a range in which the symbol exerts an influence, and FIG. 4B shows an impulse response obtained as a result of band limitation.

Next, the operation of the fourth embodiment of the invention will be described.

In FIG. 4A, #1 to #4 show signals of different users, respectively. The timings of the users are not synchronized with each other, and hence the signals seem to be shifted from each other. In this example, the number of the users is four. The embodiment operates in the same manner irrespective of the number of users. In the case where the fourth symbol of user 1 has the largest likelihood, the range in which the symbol exerts an influence consists of the third and fourth symbols of user 2 and 4, and the fourth and fifth symbols of user 3.

On the other hand, the band of a transmitted signal is usually limited. Consequently, the impulse response is symmetric with respect to the center of the signal as shown in FIG. 4B. For example, when the bank limitation is performed using a Nyquist filter, supposing that a difference from the center frequency of the signal is defined as "X", a fixed impulse response would be generated in a system taking the form of sinX/X. In a CDMA receiver which is usually used, estimation of a line is performed only at chip time intervals with correlation, and hence the generation of the a replica is performed at the chip time intervals by means of only an impulse response of a line estimated when the signal is respread for generating a replica. By contrast, in the present invention, an impulse response of the estimated line and an impulse response by means of the known band limitation at sampling time intervals, which are less than the chip time intervals, is convoluted, so that a filter having intervals which are 1/k of the chip interval, wherein the character k is an integer number, is obtained. Respreading is performed by inputting a decoded signal into the filter, resulting in that a more accurate replica can be generated at a timing other than an identification timing of a chip, thereby improving performance.

An impulse response due to band limitation depends on characteristics of a transmission/receiving filter, which results from convolutions of the transmission filter and the receiving filter. Once the transmission/receiving filter is determined, the impulse response can be determined. In the case where convolution of an impulse response of a line and that due to band limitation results in a long impulse response length because a decoded signal is inputted in a filter as long as the long impulse response, a replica is generated in a range exceeding that of one symbol so as to be canceled from a received signal. An impulse response by means of the band limitation may require several chips in such a case. As a result, if the rate of spreading is low, in the case of the convolution of the impulse response of the line and the impulse response due to the band limitation, there exists the potential that the replica would be generated in a range exceeding that of one symbol. According to this configuration, unlike a usual replica generation, even if there are timing differences of users, and a delayed wave which is not an integer multiple of the chip length, an accurate elimination of interference can be conducted, thereby sufficiently coping with such a situation.

(Fifth Embodiment)

Figure 5A:
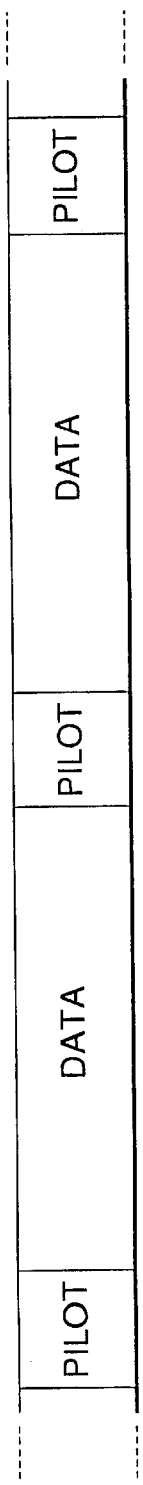
FIGS. 5A and 5B are block diagrams showing the configuration of an interference signal cancellation system according to a fifth embodiment of the invention.
Figure 5B:
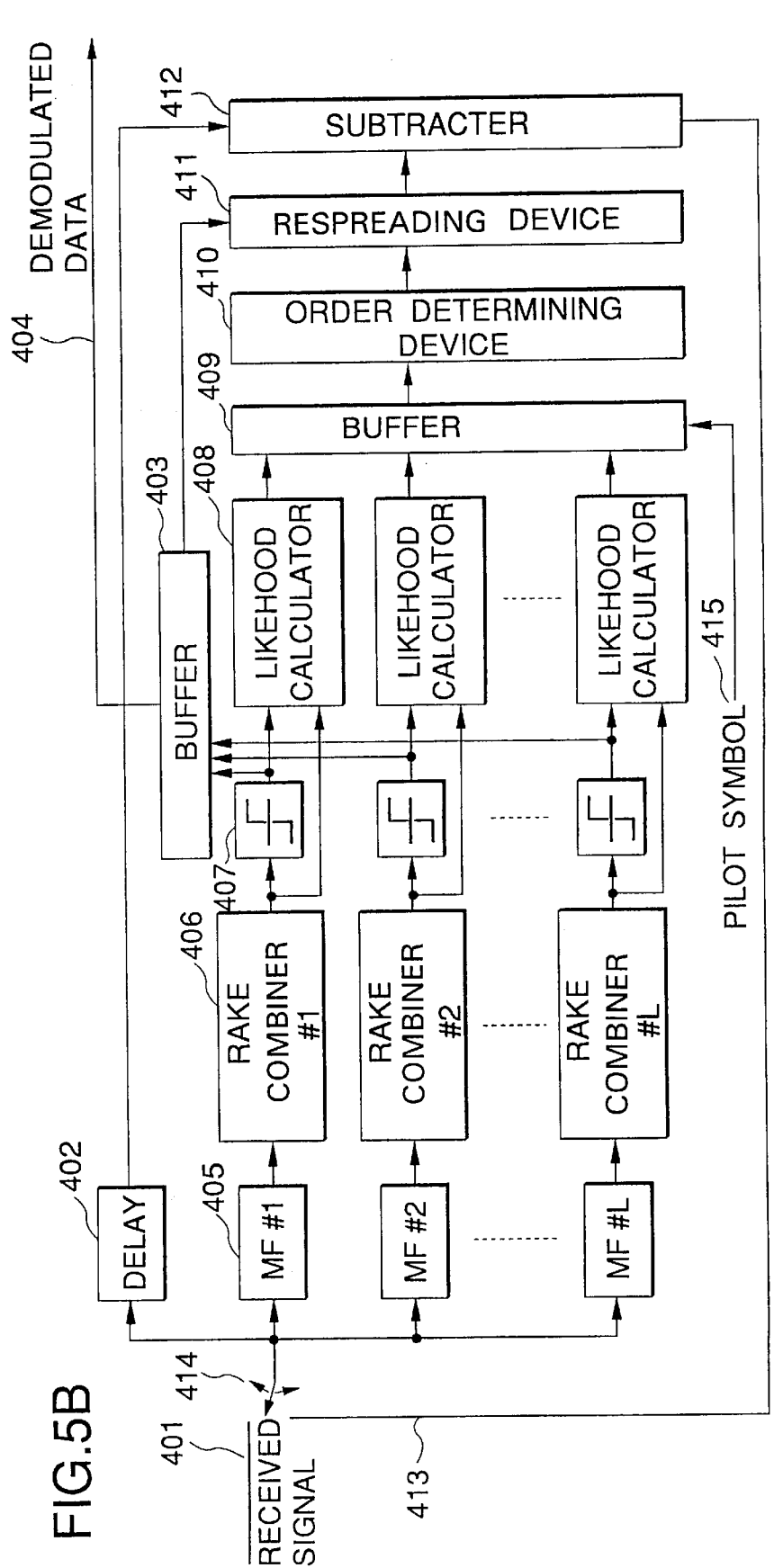

In FIGS. 5A and 5B, FIG. 5A shows a frame format, and FIG. 5B is a block diagram showing the configuration of a fifth embodiment of the invention. Referring to FIG. 5B, a selection switch 414 selects a received signal 401 or an interference-canceled signal 413. The selected signal enters a delay device 402 and matched filters 405. An output of each matched filter 405 is supplied to an identifier 407 and a likelihood calculator 408, via a RAKE combiner 406. An output of the identifier 407 is supplied to the likelihood calculator 408 and a decision value buffer 403. An output of the likelihood calculator 408 is supplied to a likelihood buffer 409. An output of the likelihood buffer is supplied to an order determining device 410. An output of the order determining device is supplied together with that of the decision value buffer 403 to a respreading device 411. An output of the respreading device and that of the delay device 402 are supplied to a subtractor 412. The decision value buffer 403 outputs a demodulated data 404. The reference numeral 415 designates a pilot symbol.

Next, the operation of the fifth embodiment of the invention will be described.

Referring to FIGS. 5A and 5B, the selection switch 414 first selects the received signal 401. The corresponding matched filter 405 correlates diffusion codes for each user, and fetches the signal of the corresponding user while suppressing signals of the other users and thermal noises. The RAKE combiner 406 performs the RAKE synthesization on the signal so as to improve the quality of the signal. The result of the synthesization is subjected to provisional decision in the identifier 407.

In a usual CDMA receiver, this result is output as a reception result. In the case where diffusion codes of plural users are not orthogonal to each other, however, the matched filters 405 cannot completely separate the codes. In the case where there exists a delayed wave, a temporal correlation exerts an influence. Furthermore, in the case where users have different timings, even when diffusion codes are orthogonal to each other, interference occurs unless a temporal correlation of zero is attained. Because of these reasons, the outputs of the identifiers 407 are lower in quality as users are larger in number.

In the fifth embodiment of the invention, all signals of all users in a certain zone (for example, a zone of one slot) are first received in the same method as a usual CDMA, and the outputs of the identifiers 407 are stored in the decision value buffer 403. Both the input and output of each of the identifiers 407 are supplied to the corresponding likelihood calculator 408, and the likelihood is calculated. The likelihood is an index indicating the probability of the symbol. For example, the Euclidean distance between the input and the output of the identifier 407 is used as the likelihood.

The outputs of the likelihood calculators 408 for all signals of the users in a certain zone are supplied to the likelihood buffer 409. The outputs are compared in magnitude with each other in the order determining device 410 and the order is determined in decreasing sequence of likelihood.

With respect to the output of the highest rank, the provisional decision value is output as it is as the demodulated data 404. At the same time, the output of the highest rank is rediffused in the respreading device 411 on the basis of the value which is provisionally decided in the identifier 407. In the subtractor 412, the output of the respreading device is subtracted from the received signal which has been delayed in the delay device 402, thereby obtaining the interference-canceled signal 413. If the provisional decision value is correct, interference on which the corresponding symbol exerts an influence is completely canceled. Thereafter, the selection switch 414 selects the interference-canceled signal 413.

In this case, it is assumed to use a transmission format such as shown in FIG. 5A. A pilot symbol for estimating a line is inserted between two data. A pilot symbol is a known value because it is used for estimating a line, and hence has the largest likelihood. When the line is correctly known, therefore, an influence which is exerted by the pilot symbol on the data zone should be completely canceled. In the likelihood buffer 409, accordingly, the largest likelihood is set to be as the likelihood of the pilot symbol 415. According to this configuration, the end portions of a data are improved in quality.

Thereafter, only symbols which are affected by the above-mentioned respreading of the provisional decision value are again subjected to the same calculation as that described above. The results of the identifiers 407 are stored in the decision value buffer 403, and the outputs of the likelihood calculators 408 in the likelihood buffer 409. The outputs are then compared in magnitude with each other in the order determining device 410 and the order is determined in decreasing sequence of likelihood. In this process, the symbol which has been initially selected is omitted.

With respect to the output of the highest rank, the provisional decision value is output as it is as the demodulated data 404. At the same time, the output of the highest rank is rediffused in the respreading device 411 by using an impulse response of the line on the basis of the value which is provisionally decided in the identifier 407. In the subtractor 412, the output of the respreading device is subtracted from the received signal which has been delayed in the delay device 402, thereby obtaining the interference-canceled signal 413. At this stage, interferences of the two symbols have been canceled.

The impulse response of the line is required in the RAKE reception. Therefore, the method performed also in an existing CDMA receiver is employed as it is. A symbol of the largest likelihood is excellent in quality and therefore has a higher probability of correctness. Consequently, the subtraction of a signal which has been rediffused allows cancellation of interference to be accurately performed.

In the case where a long code is used, symbols have different magnitudes of interference. Among a large number of symbols, therefore, symbols which are coincidentally substantially free from interference exist with a high possibility. The quality of such a symbol which has been subjected to the provisional decision is very excellent. According to the apparatus, therefore, desired performance can be obtained without increasing the number of stages to be performed in order to improve the quality. In the embodiment, the end portions of a data can be first improved in quality. Consequently, the embodiment is expected to improve performance more highly than the first embodiment.

(Sixth Embodiment)

Figure 6:
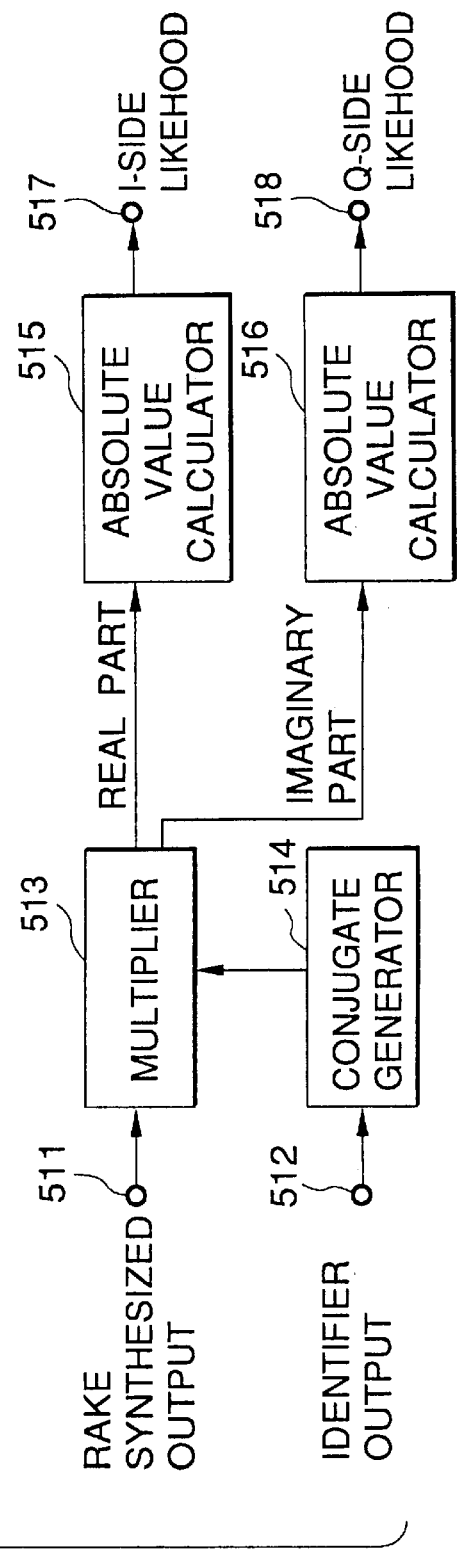
FIG. 6 is a block diagram showing the configuration of a likelihood calculator according to a sixth embodiment of the invention.
Figure 7:
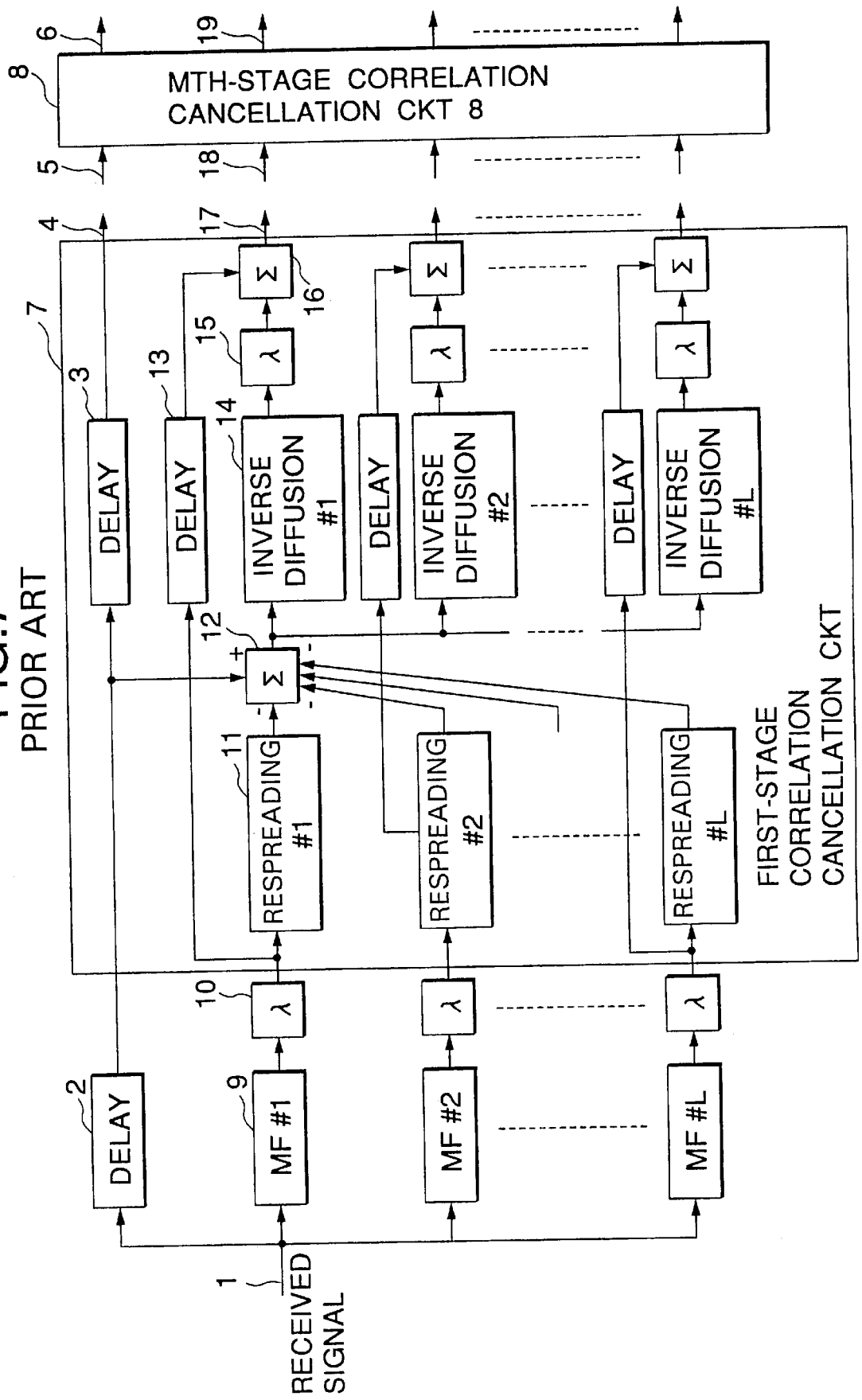
FIG. 7 is a block diagram showing the configuration of an interference cancellation system of the prior art.

FIG. 6 is a block diagram showing the configuration of a likelihood calculator in a sixth embodiment of the invention. Referring to the lower part of FIG. 6, the likelihood calculator comprises a multiplier 513, a conjugate generator 514, and absolute value calculators 515 and 516.

Next, the operation of the sixth embodiment of the invention will be described.

Referring to the upper part of FIG. 6, an identifier output 501 is obtained by reproduction of a transmission symbol which has the highest possibility from RAKE synthesized outputs 502 and 505. In QPSK, for example, it is possible to judge the phase at which transmission is conducted, from four kinds of phases (45 deg., 135 deg., 225 deg., and 315 deg.) in accordance with the quadrants of the RAKE synthesized outputs 502 and 505. The RAKE synthesized output 502 is in the first quadrant, and hence the identifier output 501 is 45 deg.

In QPSK modulation or the like, two bits are transmitted by one symbol. In this case, I- and Q-components of a demodulated signal are independent from each other. Data are reproduced while, for the I-component, the sign is judged with respect to the Q-axis, and, for the Q-component, the sign is judged with respect to the I-axis. Consequently, I- and Q-components have different likelihoods.

Specifically, the likelihood of the RAKE synthesized output 502 of FIG. 6 is low with respect to the I-component, and high with respect to the Q-component. By contrast, in the RAKE synthesized output 505, the I-component is larger in likelihood than the Q-component. Since I- and Q-components are independent from each other, higher performance is attained by providing different orders on the basis of different likelihoods and generating a replica for each of the components.

A likelihood is given by means of a distance from the axis which is used for corresponding identification. Referring to FIG. 6, in the RAKE output 502, an I-side likelihood 503 is set to be the magnitude LIA on the I-axis, and a Q-side likelihood 504 is set to be the magnitude LQA on the Q-axis. Similarly, in the RAKE output 505, an I-side likelihood 506 is set to be the magnitude LIB on the I-axis, and a Q-side likelihood 507 is set to be the magnitude LQB on the Q-axis. In this case, it is assumed that the likelihood is larger as the value is larger.

The likelihood calculator which obtains the value will be described. A RAKE synthesized output 511 is multiplied in the multiplier 513 with a conjugate value which is produced from an identifier output 512 in the conjugate generator 514. Therefore, the RAKE synthesized output 511 is moved into the first quadrant. The absolute value calculator 515 obtains the absolute value of the real part of the RAKE synthesized output moved into the first quadrant, as an I-side likelihood 517, and the absolute value calculator 516 obtains the absolute value of the imaginary part as a Q-side likelihood 518. Then, interference is canceled while orders on the I- and Q-sides are independently provided on the basis of the likelihoods. As a result, the embodiment can attain higher performance than the first to fifth embodiments.

As apparent from the above description, according to the invention, the allowable number of subscribers of a CDMA mobile communication system can be increased by suppressing likelihood between codes. The invention can attain the effects also in cases such as that where codes are not synchronized with each other, where a long code is used as a diffusion code, and where there exists a delayed wave.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An interference signal cancellation system, comprising:

a CDMA demodulator disposed for each of a plurality of diffusion codes and having a matched filter and an identifier;

a likelihood calculator for each of said CDMA demodulators;

a first buffer for storing provisional decision values;

a second buffer for storing likelihoods;

an order determining device for determining an order according to the likelihoods stored in said second buffer;

a respreading device for performing respreading according to the order determined by said order determining device; and a delay device for delaying a received signal; and a subtractor for subtracting a result of the respreading from data of the signal delayed by said delay device;

wherein interference is canceled while demodulating codes in decreasing order of likelihood.

2. An interference signal cancellation system according to claim 1, wherein said likelihood calculator comprises one of a set of a conjugate generator, a multiplier, an arc tangent calculator, and an absolute value calculator, and a set of an arc tangent calculator, a subtractor, and an absolute value calculator; and wherein said likelihood calculator outputs an absolute value of a phase difference between an input and an output of said identifier.

3. An interference signal cancellation system according to claim 1, wherein said likelihood calculator comprises one of a set of a conjugate generator, a multiplier, and a likelihood addition ROM, and a set of a conjugate generator, a multiplier, an I*Q calculator, and an absolute value calculator; and wherein a likelihood is set to be larger as an input of said identifier is more remote from an I-axis and a Q-axis.

4. An interference signal cancellation system according to claim 1, wherein, in respreading of said respreading device, when users have different timings or when there exists a delayed wave, respreading is performed by convoluting an impulse response which is obtained by convoluting an impulse response of a transmission/reception filter, into an estimated line in consideration of influence due to band limitation, to improve performance.

5. An interference signal cancellation system according to claim 1, wherein, in the order determination of said order determining device, when a frame contains a known signal, the order is determined with assigning highest priority to the known signal, thereby improving performance.

6. An interference signal cancellation system according to claim 1, wherein, in said likelihood calculator, said calculator comprises a conjugate generator, a multiplier, and an absolute value calculator, and independent likelihoods are respectively added to I and Q sides on the basis of real and imaginary parts obtained as a result of multiplication;

wherein in said order determining device, the I and Q sides are independently handled; and wherein in said respreading device and said subtractor, the I and Q sides are processed in independent orders according to the order determined by said order determining device.

\* \* \* \* \*